US012377671B2

United States Patent
Tanaka et al.

(10) Patent No.: US 12,377,671 B2
(45) Date of Patent: Aug. 5, 2025

(54) PRINTING APPARATUS

(71) Applicant: BROTHER KOGYO KABUSHIKI KAISHA, Nagoya (JP)

(72) Inventors: Mitsugi Tanaka, Nagoya (JP); Kenji Samoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/142,361

(22) Filed: Jan. 6, 2021

(65) Prior Publication Data

US 2021/0122174 A1 Apr. 29, 2021

Related U.S. Application Data

(63) Continuation of application No. PCT/JP2019/027097, filed on Jul. 9, 2019.

(30) Foreign Application Priority Data

Jul. 13, 2018 (JP) ................................ 2018-133199

(51) Int. Cl.
*B41J 11/70* (2006.01)
*B41J 2/175* (2006.01)
*B41J 15/04* (2006.01)

(52) U.S. Cl.
CPC ............... *B41J 11/70* (2013.01); *B41J 2/175* (2013.01); *B41J 15/04* (2013.01)

(58) Field of Classification Search
CPC ... B41J 11/70; B41J 2/175; B41J 15/04; B41J 2/1752; B41J 29/02; B41J 29/13; B41J 15/042; B41J 2/01
See application file for complete search history.

(56) References Cited

U.S. PATENT DOCUMENTS

| | | | |
|---|---|---|---|
| 6,260,457 | B1 | 7/2001 | Hakkaku |
| 2002/0033853 | A1 | 3/2002 | Aratsu |

(Continued)

FOREIGN PATENT DOCUMENTS

| | | | | |
|---|---|---|---|---|
| CN | 106019885 B | * 12/2018 | | G03G 15/6514 |
| CN | 113613908 A | * 11/2021 | | B41J 11/70 |

(Continued)

OTHER PUBLICATIONS

Akaboshi K; Thermal Printer Detects Whether Consumables Used For Character Printing Correspond To Preset Amount, And Prints Specific Information Showing Purport That Consumables Are Of Preset Amount, Mar. 2, 2006, Japan, All pages (Year: 2006).*

(Continued)

*Primary Examiner* — Douglas X Rodriguez
*Assistant Examiner* — Tracey M McMillion
(74) *Attorney, Agent, or Firm* — Merchant & Gould P.C.

(57) ABSTRACT

There is provided a printing apparatus including a casing; a conveyor; a head; a tank; a passing port; and a cutter. The cutter includes a blade, and a moving mechanism configured to move the blade. In an orthogonal direction orthogonal to a conveyance direction and a cutting direction, at least a part of the passing port is located at a same position as the tank. In the orthogonal direction, at least a part of the cutter is located at a same position as the tank. The tank is positioned to be away from the passing port to one side in the cutting direction. A part of the cutter is positioned to be away from the passing port to the other side in the cutting direction.

18 Claims, 7 Drawing Sheets

(56) References Cited

U.S. PATENT DOCUMENTS

| | | | | |
|---|---|---|---|---|
| 2006/0214351 | A1 | 9/2006 | Watanabe | |
| 2009/0196673 | A1* | 8/2009 | Akatsu | B41J 11/0085 400/621 |
| 2011/0182645 | A1* | 7/2011 | Yamaguchi | B26D 7/025 400/621 |
| 2011/0187803 | A1* | 8/2011 | Tajima | B41J 11/485 271/226 |
| 2012/0038719 | A1 | 2/2012 | Shimizu et al. | |
| 2012/0056365 | A1* | 3/2012 | Kato | B41J 11/006 271/9.1 |
| 2012/0105540 | A1 | 5/2012 | Kondo et al. | |
| 2012/0140010 | A1 | 6/2012 | Ogawa et al. | |
| 2013/0222457 | A1 | 8/2013 | Nakada et al. | |
| 2014/0002552 | A1 | 1/2014 | Takeuchi et al. | |
| 2015/0202904 | A1* | 7/2015 | Okuda | B41J 25/304 347/8 |
| 2016/0096382 | A1 | 4/2016 | Kojima | |
| 2017/0151815 | A1 | 6/2017 | Masunaga | |
| 2017/0368849 | A1 | 12/2017 | Masunaga | |
| 2018/0126744 | A1 | 5/2018 | Moriyama et al. | |
| 2018/0126760 | A1* | 5/2018 | Shimizu | B41J 11/66 |
| 2018/0147853 | A1 | 5/2018 | Shimizu | |

FOREIGN PATENT DOCUMENTS

| | | | | | |
|---|---|---|---|---|---|
| JP | 6-198989 | A | | 7/1994 | |
| JP | 11-78140 | A | | 3/1999 | |
| JP | 2000-318176 | A | | 11/2000 | |
| JP | 2003-112453 | A | | 4/2003 | |
| JP | 2005-169745 | A | | 6/2005 | |
| JP | 2006-56054 | A | | 3/2006 | |
| JP | 2006-248750 | A | | 9/2006 | |
| JP | 2007-261038 | A | | 10/2007 | |
| JP | 2010-69770 | A | | 4/2010 | |
| JP | 2011-152674 | A | | 8/2011 | |
| JP | 2012-56110 | A | | 3/2012 | |
| JP | 2012-116122 | A | | 6/2012 | |
| JP | 2012207202 | A | * | 10/2012 | C09D 11/30 |
| JP | 2013-28093 | A | | 2/2013 | |
| JP | 2013-173281 | A | | 9/2013 | |
| JP | 2013-180542 | A | | 9/2013 | |
| JP | 2014-159172 | A | | 9/2014 | |
| JP | 2014-210411 | A | | 11/2014 | |
| JP | 2014217971 | A | * | 11/2014 | |
| JP | 2015-91670 | A | | 5/2015 | |
| JP | 2015-134447 | A | | 7/2015 | |
| JP | 2015-178188 | A | | 10/2015 | |
| JP | 2017-56611 | A | | 3/2017 | |
| JP | 2017-100313 | A | | 6/2017 | |
| JP | 2018-2479 | A | | 1/2018 | |
| JP | 2018-69696 | A | | 5/2018 | |
| JP | 2018-89814 | A | | 6/2018 | |
| JP | 2018-99856 | A | | 6/2018 | |
| WO | 2018/117215 | A1 | | 6/2018 | |

OTHER PUBLICATIONS

Sano Yasuhiko; Recording Device, and Method of Detecting Fault of Temperature Sensor and the Like of the Recording Device; Nov. 20, 2014, Japan, All Pages (Year: 2014).*

Fukasawa, Koki; Printer, Nov. 5, 2021, China, All Pages (Year: 2021).*

International Preliminary Report on Patentability and Written Opinion issued in corresponding International Patent Application No. PCT/JP2019/027097 mailed Sep. 10, 2019.

International Search Report issued in corresponding International Patent Application No. PCT/JP2019/027097, Sep. 10, 2019.

Notice of Reasons for Refusal issued in corresponding Japanese Patent Application No. 2018-133199, mailed May 10, 2022.

Notice of Reasons for Refusal issued in corresponding Japanese Patent Application No. 2022-123202, Jul. 11, 2023.

Notice of Reasons for Refusal issued in corresponding Japanese application 2022-123202, Sep. 26, 2023.

Notice of Reasons for Refusal issued in corresponding Japanese Patent Application No. 2022-123202, Jun. 21, 2024.

Notice of Reasons for Refusal issued in the corresponding Japanese Patent Application No. 2023-218991, Sep. 24, 2024.

* cited by examiner

PRINTING APPARATUS

CROSS REFERENCE TO RELATED APPLICATION

The present application is a continuation of International Application No. PCT/JP2019/027097 filed on Jul. 9, 2019 which claims priority from Japanese Patent Application No. 2018-133199 filed on Jul. 13, 2018.

TECHNICAL FIELD

The present disclosure relates to a printing apparatus in which an ink stored in a tank is discharged or ejected by a printing head onto a medium and the medium is cut by a cutter.

BACKGROUND ART

There is known a printing apparatus in which an ink stored in a tank is discharged or ejected by a printing head onto a medium. As an example of the medium, there is a sheet which is long and continuous in a conveyance direction. After printing has been performed on this sheet, the sheet is cut by a cutter. The cut sheet may include, for example, a plurality of print units. The sheet is constructed, for example, of a label and a release paper. For example, one print unit is printed on each label, and from a cut sheet, each label is released or peeled off from the release paper and is adhered to a merchandise, etc.

SUMMARY

According to an aspect of the present disclosure, there is provided a printing apparatus including: a casing; a conveyor positioned in the casing, and configured to convey a medium in a conveyance direction; a head positioned at a downstream in the conveyance direction of the conveyor, and configured to discharge an ink toward the medium conveyed in the conveyance direction by the conveyor; a tank configured to store the ink to be supplied to the head, wherein at least a part of the tank is positioned in the casing; a passing port being opened in the casing toward the downstream in the conveyance direction, wherein the medium on which the ink has discharged from the head passes through the passing port; and a cutter configured to cut the medium along a cutting direction crossing the conveyance direction. The cutter includes: a blade; and a moving mechanism configured to move the blade to a position at which the blade is arranged side by side to the passing port in the conveyance direction and to a position at which the blade is not arranged side by side to the passing port in the conveyance direction. In an orthogonal direction orthogonal to the conveyance direction and the cutting direction, at least a part of the passing port is located at a same position as the tank. In the orthogonal direction, at least a part of the cutter is located at a same position as the tank. The tank is positioned to be away from the passing port to one side in the cutting direction. A part of the cutter is positioned to be away from the passing port to the other side in the cutting direction. Note that the moving mechanism of the cutter may be a carriage which has the blade installed therein and which is movable in the cutting direction; and in a case that the carriage is in a standby state, the carriage may be positioned away from the passing port to the other side in the cutting direction.

According to the above-described configuration, it is possible to suppress the size in the scanning direction of the printing apparatus, while realizing the reduction in thickness of the printing apparatus by suppressing the size in the orthogonal direction of the printing apparatus, thereby making it possible to suppress the footprint of the printing apparatus. Further, the tank and/or the printing medium after the printing can be accessed from the downstream in the conveyance direction with respect to the casing. Note that, as will be described later on, the conveyance direction is defined as a conveyance direction for the medium in a lower side of the printing head (at a position at which the ink is discharged or ejected).

DESCRIPTION OF THE EMBODIMENTS

Overview of the Present Disclosure

Figure 1:
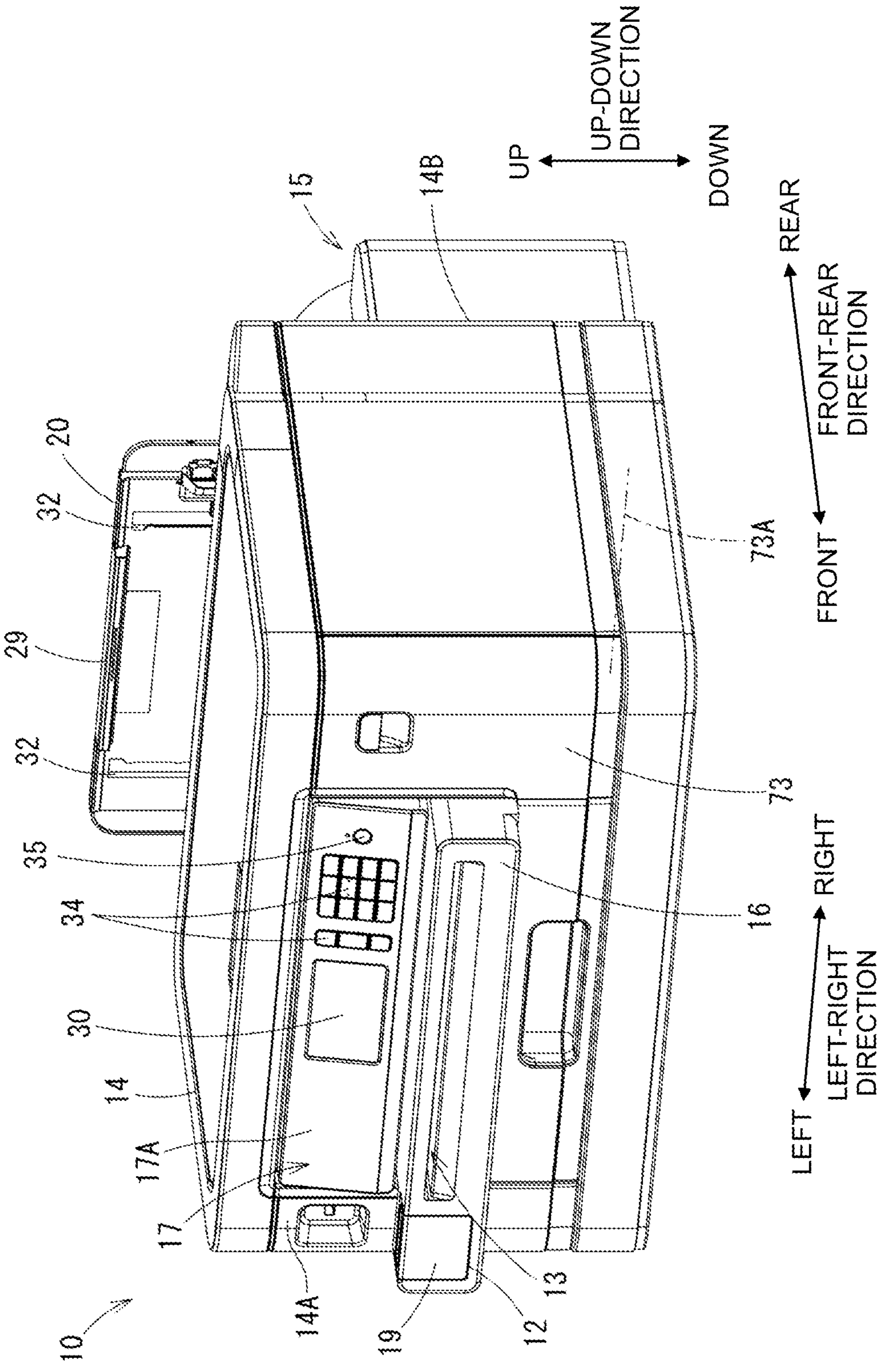
FIG. 1 is a perspective view of a printing apparatus 10, as seen from a side of a front surface 14A.

In a case that a sheet having the printing performed thereon is discharged, for example, on the front side with respect to the printing apparatus, the printer sheet is easily taken out from the printing apparatus. Further, in a case that the ink is replenished in the tank, and/or that the tank is exchanged, the operability of the printing apparatus becomes satisfactory if the tank can be accessed from the front side of the printing apparatus. Furthermore, in a case that the cutter is exchanged, the maintainability (serviceability) of the printing apparatus becomes satisfactory if the cutter can be accessed from the front side and/or an upper side of the printing apparatus. In such a manner, in a case that the sheet, tank and/or the cutter can be accessed from a specific direction with respect to the printing apparatus, a printing apparatus with a satisfactory operability is realized.

However, in a case that a passaging port via which the sheet is allowed to pass and an access route to the tank, etc., are provided in a specific surface of the printing apparatus so as to allow access to the sheet and/or the tank from the specific direction, the area (size) of the specific surface of the printing apparatus becomes large, which in turn leads to an increase in the size of the printing apparatus.

The present disclosure has been made in view of the above-described situation, and an object of the present disclosure is to provide a printing apparatus in which a sheet and/or a tank can be accessed from a specific direction with respect to the printing apparatus, and which realizes the reduction in thickness and in the size of the printing apparatus.

The cutter unit may be positioned in the internal space of the casing; and the casing may have an expose port via which the cutter is exposed to outside in the state that the carriage is in the standby state, and a cover which opens and closes the expose port.

In this case, by opening the cover so as to expose the expose port, it is possible to exchange the cutter installed in the carriage.

The printing apparatus may further include: a holder positioned at an upstream in the conveyance direction of the casing, and having a storing space storing the medium which is wound in a roll shape so that a rotational axis of the medium is along the cutting direction; and a tray which is connected to the casing to be rotatable about an axis, of the tray, along the cutting direction and which moves between a first position and a second position. The axis of the tray may be positioned at the downstream in the conveyance direction of the rotational axis of the medium stored in the storing space. The second position may be a such a position that the tray at the second position is tilted toward an upstream in the conveyance direction to a greater extent than in a case that the tray is at the first position. The tray at the second position may be arranged so that the tray is arranged side by side to the storing space in the orthogonal direction.

In this case, as seen from the orthogonal direction, the tray at the second position overlaps with the storing space of the holder, thereby suppressing the size in the conveyance direction of the printing apparatus. Further, the tray at the first position is not tilted as compared with the tray at the second position; thus, by positioning the tray at the first position, the medium can be easily installed in the storing space.

The tank may be positioned at a right side with respect to the passing port as seen from the downstream to an upstream in the conveyance direction. The carriage in the standby state may be positioned at a left side with respect to the passing port as seen from the downstream to the upstream in the conveyance direction.

A frequency at which the tank is accessed is higher than a frequency at which the cutter is exchanged, and thus the operability is satisfactory by positioning the tank at the right side with respect to the passing port.

In the casing, an operation panel having an operation surface via which an input with respect to the printing apparatus is received may be provided on the casing, at least a part of the operation panel being positioned at a same position as the passing port in the orthogonal direction. The operation surface may be oriented toward the downstream in the conveyance direction.

In this case, since the operation panel can be accessed from the downstream in the conveyance direction, a satisfactory operability is provided.

The carriage may be positioned at the downstream in the conveyance direction of the operation panel.

In this case, when the carriage is accessed via the expose port, the operation panel is less likely to interfere.

The printing head may be positioned at an upstream in the conveyance direction of the tank.

The tank may have an inlet port, and may be configured so that the ink is replenishable in the tank via the inlet port.

The tank may be detachable from the casing toward the downstream in the conveyance direction.

According to the present disclosure, the sheet and/or the tank can be accessed from a specific direction with respect to the printing apparatus, and the reduction in thickness and in the size of the printing apparatus can be realized.

An Embodiment of the Present Disclosure

A printing apparatus 10 according to an embodiment of the present disclosure will be explained below. Note that an embodiment which is to be explained below is merely an example of the present disclosure; it is needless to say that the embodiment can be appropriately changed within a range not changing the gist of the present disclosure. Further, in the following explanation, advancement or movement (progress) directed from a starting point to an end point of an arrow is expressed as an “orientation”, and going forth and back on a line connecting the starting point and the end point of the arrow is expressed as a “direction”. Furthermore, in the following explanation, an up-down direction is defined, with a state in which the printing apparatus 10 is usably or operably installed (the state of FIG. 1) as the reference; a front-rear direction is defined, with a side on which a passing port 13 is provided is defined as a front side (front surface); and a left-right direction is defined, with the printing apparatus 10 as seen from the front side (front surface).

<Overall Configuration of Printing Apparatus 10>

As depicted in FIG. 1, the printing apparatus 10 records an image on roll paper 11 (see FIGS. 1 to 4: an example of a “recording medium”), etc., in the ink-jet recording system. A casing 14 has a substantially rectangular parallelepiped shape in which the passing port 13 is formed in a front surface 14A of the casing 14.

A holder 15 capable of storing the roll paper 11 therein is positioned on the rear side with respect to the casing 14. A tray 20 extends upward from a rear surface of the casing 14. An operation panel 17 is positioned in the front surface 14A of the casing 14. A projected part 16, which is a part of the casing 14 projected frontward, is positioned at a location below the operation panel 17. The projected part 16 has a rectangular parallelepiped shape which is slender and elongated shape of which longitudinal direction is the left-right direction. A cutter 18 (see FIG. 6) is positioned in an internal space of the projected part 16.

<Holder 15>

Figure 2:
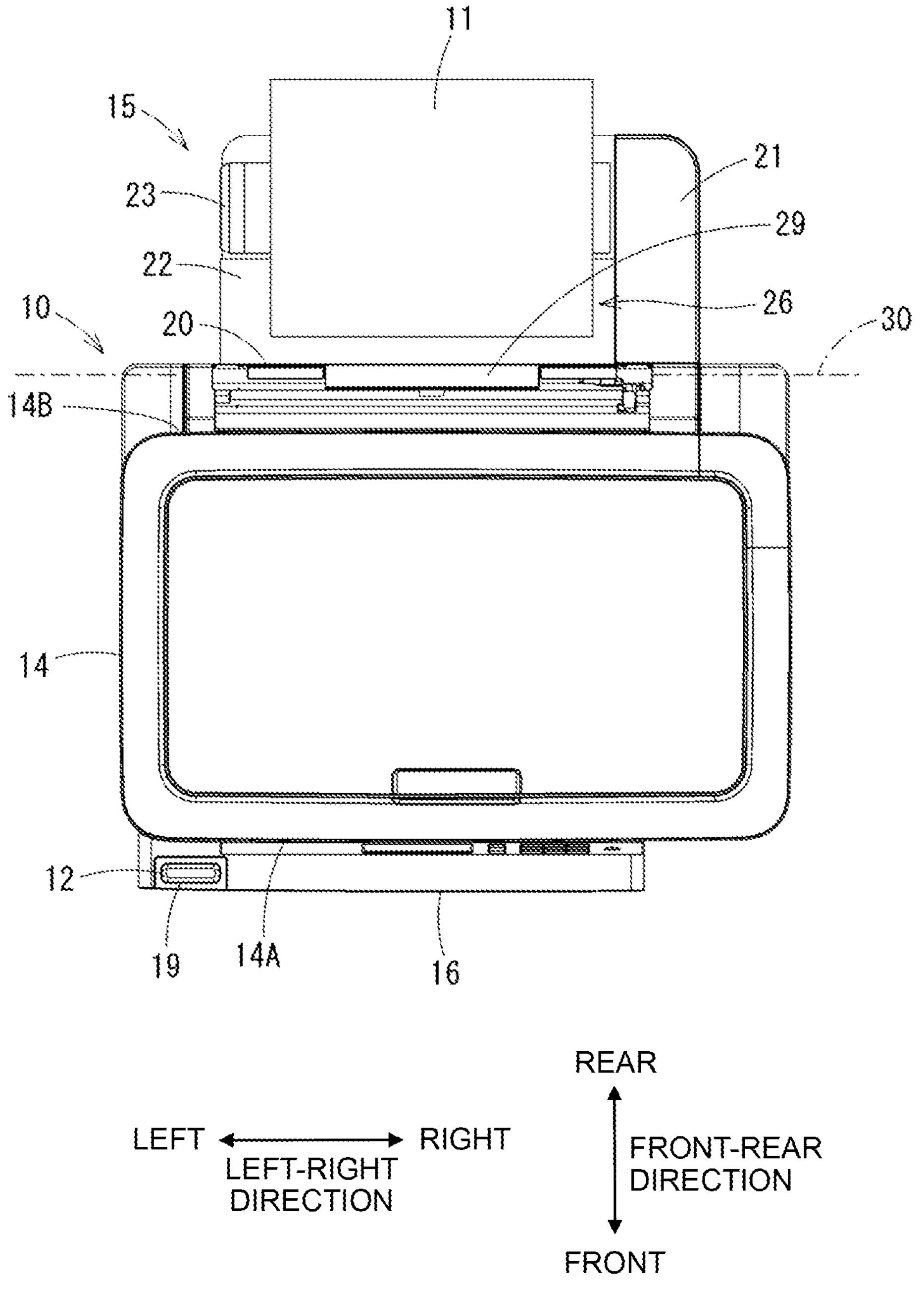
FIG. 2 is a plan view of the printing apparatus 10.
Figure 3:
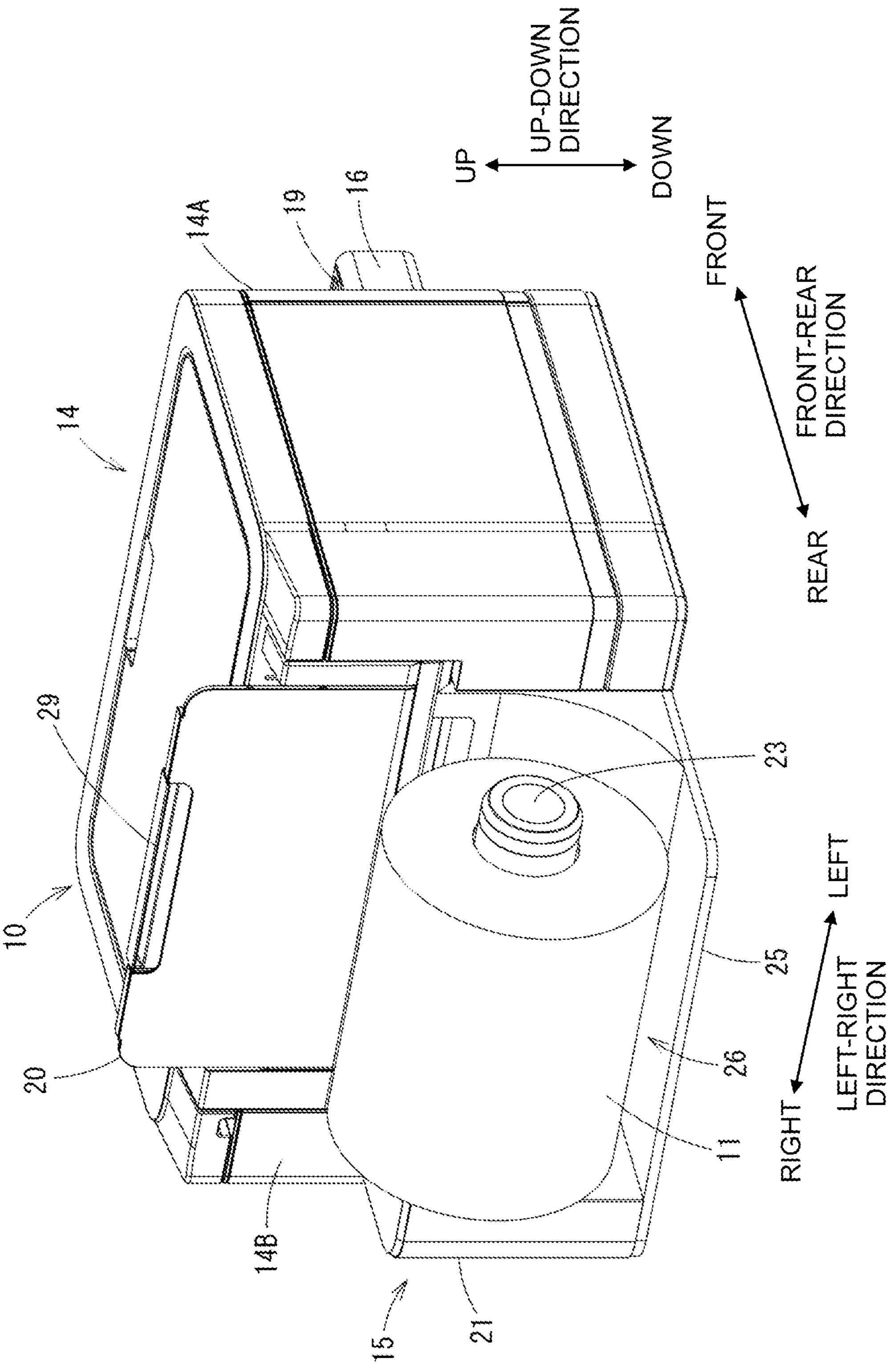
FIG. 3 is a perspective view of the printing apparatus 10 as seen from a side of a rear surface 14B and in a state that a supporting wall 22 is removed.
Figure 4:
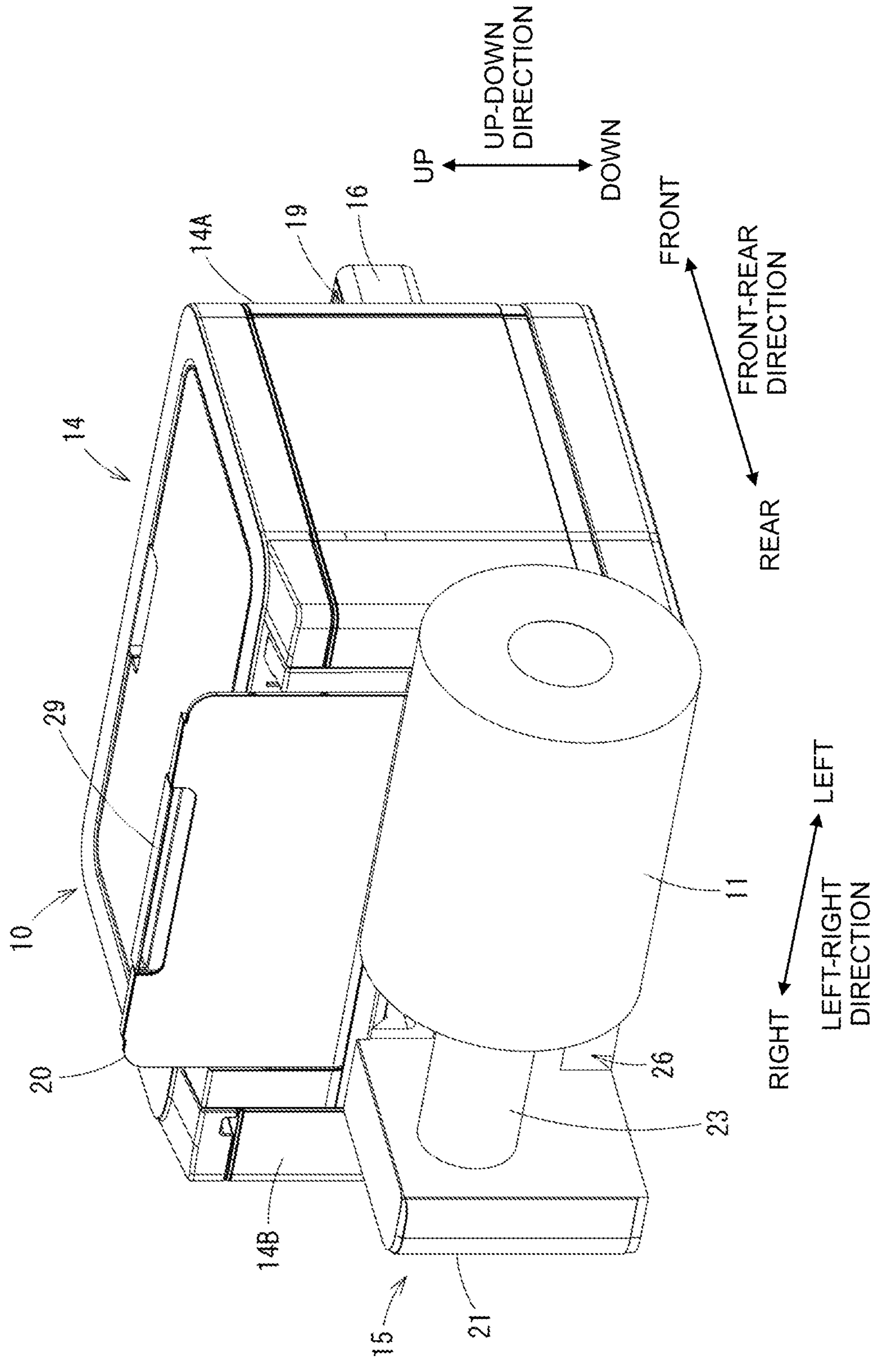
FIG. 4 is a perspective view of the printing apparatus 10 as seen from the side of the rear surface 14B and in a state that a roll paper 11 stored in a holder 15 is partially pulled out from a rotational shaft 23.

As depicted in FIGS. 2 to 4, the holder 15 has a supporting wall 21 located on the right side with respect to the holder 15, a rotational shaft 23 extending leftward from the supporting wall 21, and a bottom plate 25 continued from the supporting wall 21.

The supporting wall 21 extends rearward from a rear surface 14B of the casing 14. The bottom plate 25 spreads over a lower end of the rear surface 14B of the casing 14 and a lower end of the supporting wall 21. The bottom plate 25 makes the rear surface 14B of the casing 14B and the supporting wall 21 to be continuous to each other. A space surrounded by the rear surface 14B of the casing 14, the supporting wall 21 and the bottom plate 25 is a storing space 26. The roll paper 11 is stored in the storing space 26.

The rotational shaft 23 is a columnar-shaped member inserted into a space extending along the center of the roll paper 11. A right end of the rotational shaft 23 is rotatably supported by the supporting wall 22. The rotational shaft 23 is supported by the supporting wall 21 in a state that the rotational shaft 23 is inserted into the roll paper 11 and that the rotational shaft 23 extends along the left-right direction. With this, the roll paper 11 is stored in the storing space 26 of the holder 15. The roll paper 11 stored in the holder 15 enters into the internal space of the casing 14 from an opening 27 (see FIG. 5) which is formed in the rear surface 14B of the casing 14.

<Tray 20>

Figure 5:
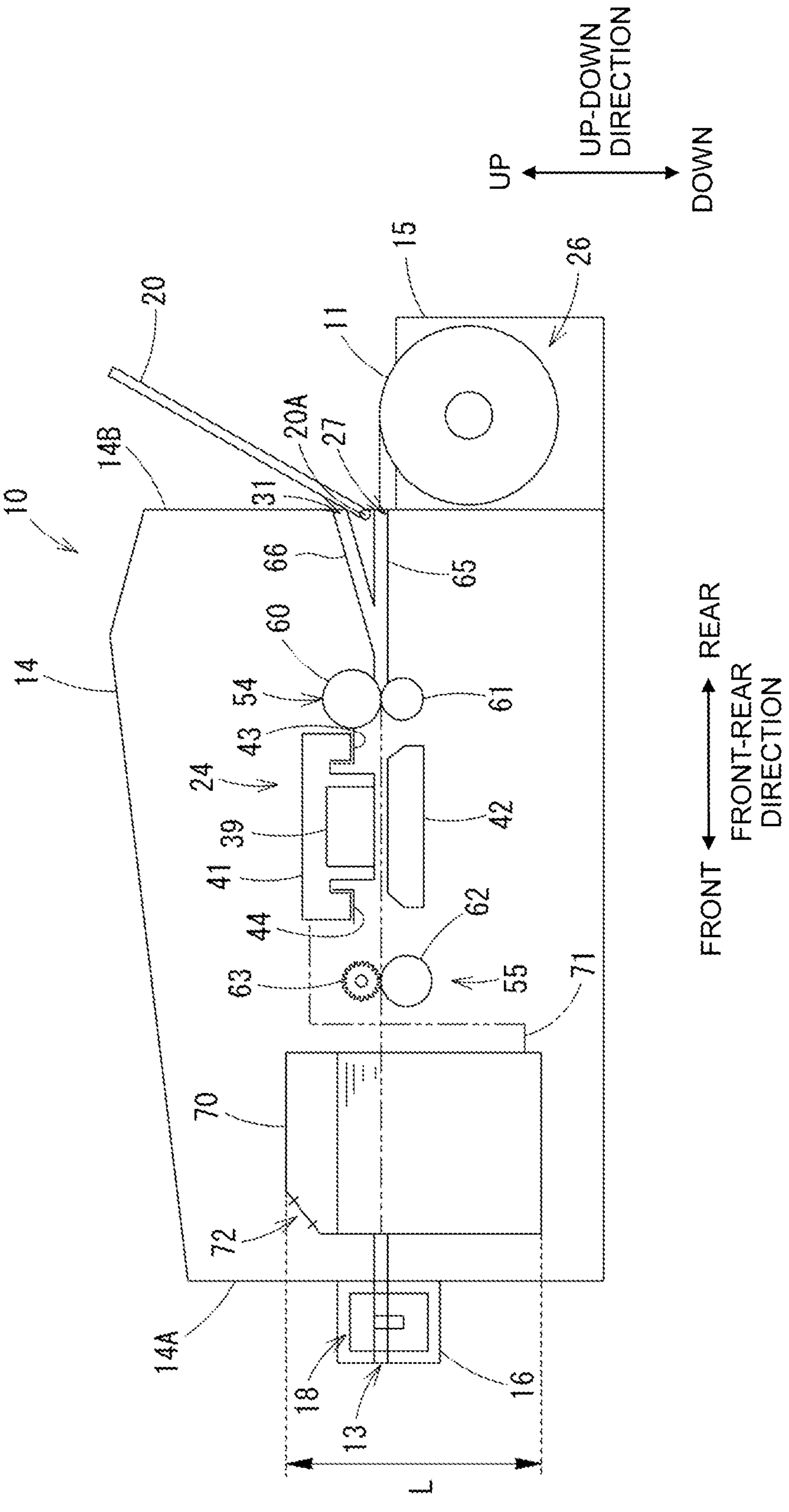
FIG. 5 is a schematic view depicting the internal configuration of the printing apparatus 10.

The tray 20 is provided on the side of a rear surface of the printing apparatus 10. The tray 20 supports a plurality of rectangular recording paper sheets, separately (independently) from the holder 15. The tray 20 is supported rotatably by the casing 4, with a lower end of the tray 20 being a rotational base end of the tray 20, and an upper end of the tray 20 being a rotational forward end of the tray 20. As depicted in FIG. 5, rotational shafts 20A protruding to outer sides in the left-right direction, respectively, are provided at locations in the vicinity of lower ends in both side surfaces, respectively, of the tray 20; the rotational shafts 20A are fitted to bearings, respectively, of the casing 14 to thereby allow the tray 20 to be rotatable (pivotable) about an axis line 30 (see FIG. 2). The axis line 30 is positioned on the front side with respect to the rotational shaft 23 of the holder 15.

The tray 20 is rotatable between a standing position as depicted in FIG. 1 (an example of a "first position") and a tilted position as depicted in FIG. 5 (an example of a "second position"). The standing position is a position assumed by the tray 20 in a case that the tray 20 is not used so that a space in the front-rear direction occupied by the tray 20 is made small. The rear surface of the tray 20 at the standing position is substantially parallel to the rear surface 14A of the casing 14. The tilted position is a position at which the tray 20 is tilted obliquely upward, from the casing 14, to the rear side. The front and rear surfaces, for example, of a single sheet of a recording paper (an example of the "recording medium") supported by the tray 20 which is at the tilted position cross the vertical direction.

As depicted in FIG. 1, a pair of side guides 32 are provided on a front surface of the tray 20. The pair of side guides 32 are positioned to be apart from each other in the left-right direction. The pair of side guides 32 make contact with both ends, respectively, in the left-right direction of a recording paper sheet supported by the front surface of the tray 20 to thereby position the recording paper sheet in the left-right direction. Further, an extended tray 29 is provided on the tray 20; the extended tray 29 is stored in an internal space of the tray 20, and extends from an upper end of the tray 20 by being pulled out from the internal space. By the extended tray 29 being pulled out from the internal space of the tray 20, the extended tray 29 projects upward from the upper surface of the tray 29, and the extended tray 29 supports the recording paper sheet. By the extended tray 29 being stored in the internal space of the tray 20, the outer shape of the tray 20 becomes small.

As depicted in FIG. 5, the recording paper sheet supported by the tray 20 at the tilted position enters into the internal space of the casing 14 via an opening 31. The position of the tray 20 is arbitrarily selectable by an operation by a user. A part on the side of the upper end of the tray 20 at the tilted position overlaps with the storing space 26 of the holder 15, as seen along the up-down direction.

<Operation Panel 17>

As depicted in FIG. 1, the operation panel 17 is positioned, in the front surface 14A of the casing 14, at a location above the projected part 16. A front surface of the operation panel 17 is an operation surface 17A. A display 33, an operation key 34, a power source button 35, etc., are positioned in the operation surface 17A. Although the operation surface 17A is substantially oriented frontward, it is allowable, for example, that even if the operation panel 17 is oriented frontward and upward, the operation panel 17 is rotatable (pivotable) with respect to the casing 14 to thereby make the orientation of the operation surface 17A to be variable.

<Conveying Route 65>

As depicted in FIG. 5, a conveying route 65 provided on the internal space of the casing 14 extends substantially straight from the opening 27 formed in the rear surface 14B toward the passing port 13 formed in the projected part 16. The conveying route 65 is defined by guide members positioned to be apart from each other in the up-down direction, etc. A part extending from the roll paper 11, and the recording paper sheet pass the conveying route 65. Note that in FIG. 5, a part, of the conveying route 65, which is on the downstream in a conveyance orientation of a first conveying roller pair 54 is indicated by a two-dots-chain line. Further note that the conveyance orientation is defined as an orientation in which the medium such as the roll paper, etc., is conveyed between a printing head 39 and a platen 42 in the up-down direction.

<Bypass Route 66>

As depicted in FIG. 5, a bypass route 65 provided in the internal space of the casing 14 extends frontward and downward from the opening 31 formed in the rear surface 14B, and continues to a location, in the conveying route 65, on the rear side with respect to the first conveying roller pair 54. The bypass route 66 is defined by guide members positioned to be apart from each other in the up-down direction. The recording paper sheet supported by the tray 20 passes the bypass route 66.

<First Conveying Roller Pair 54 and Second Conveying Roller Pair 55>

As depicted in FIG. 5, the first conveying roller pair 54 (an example of a "conveyor") is provided in the conveying route 65 at a location on the upstream side in the conveyance orientation (frontward orientation in the front-rear direction) with respect to a recording part 24. The first conveying roller pair 54 has a first conveying roller 60 and a pinch roller 61. A second conveying roller pair 55 is provided in the conveying route 65 at a location on the downstream side in the conveyance orientation with respect to the recording part 24. The second conveying roller pair 55 has a second conveying roller 62 and a spur 63. The first conveying roller 60 and the second conveying roller 62 rotate by rotation of a motor (not depicted in the drawings) transmitted thereto. The first conveying roller 60 and the second conveying roller 62 rotate in a state that the part extending from the roll paper 11 or the recording paper sheet is pinched or held between the respective rollers constructing the first and second conveying roller pairs 54 and 55, the first conveying roller pair 54 and the second conveying roller pair 55 thereby convey the roll paper 11 or the recording paper sheet.

<Recording Part 24>

As depicted in FIG. 5, the recording part 24 is provided at a location above the conveying route 65 so as to face the platen 42, between the first conveying roller pair 54 and the second conveying roller pair 55. The recording part 24 is provided with a head carriage 41 and a printing head 39. The head carriage 41 is supported by carriage guide rails 43 and 44 provided on the rear side and the front side, respectively, of the platen 42. A publicly known belt mechanism is provided on the carriage guide rail 44. The head carriage 41 is connected an endless belt of the belt mechanism and moves in the left-right direction along the carriage guide rails 43 and 44 by the rotation of the endless belt.

The printing head 39 is installed in the head carriage 41. A plurality of nozzles (not depicted in the drawings) are formed in a lower surface of the printing head 39. An ink is supplied to the printing head 39 from a tank 70 via a tube 71. The printing head 39 discharges or ejects the ink selectively from the plurality of nozzles, as minute droplets of the ink (ink droplets). The ink droplets are ejected from the plurality of nozzles onto the roll paper 11 or the recording paper sheet supported by the platen 42 while the head carriage 41 is being moved in the left-right direction. The ejected ink droplets adhere to the roll paper 11 or the recording paper sheet supported by the platen 42, thereby allow an image and/or a letter to be printed on a part of the roll paper 11 or the recording paper sheet.

<Tank 70>

As depicted in FIG. 5, the tank 70 is positioned in the internal space of the casing 14. The tank 70 is a container having a hollow shape and storing the ink therein. The tank 70 has a plurality of storing spaces which store, for example, black, yellow, cyan and magenta pigment inks, respectively. An inlet port 72 is formed in the tank 70, at a location in the vicinity of an upper end of a front surface of the tank 70. The ink can be replenished in each of the storing spaces of the tank 70 via the inlet port 72. The inlet port 72 is provided on each of the storing spaces. Although not depicted in FIG. 5, each of the inlet ports 72 is sealed by a cap; the ink can be replenished from the inlet port 72 in a case that the cap is removed therefrom. The tank 70 is positioned on the front side with respect to the print head 39, namely on the downstream side in the conveyance direction with respect to the print head 39.

As depicted in FIG. 1, a cover 73 is provided on the right side in the left-right direction in the front surface 14A on the casing 14. The cover 73 is positioned on the right side with respect to the projected part 16. The cover 73 is rotatable at a location in the vicinity of a lower end of the cover 73, about a rotational axis 73A along the left-right direction. Namely, the cover 73 is rotatably linked or connected to the casing 14. As depicted in FIG. 1, the cover 73 in a closed state constructs the front surface 14A of the casing 14. The tank 70 is positioned on the rear side with respect to the cover 73. Namely, the tank 70 is positioned to be away from the passing port 13 to the right side with respect to the passing port 13.

The cover 73 is rotated about the rotational axis 73A to thereby allow an upper end side of the cover 73 is moved frontward, and to expose at least a part, of the tank 70 located in the internal space of the casing 14, which is in the vicinity of the inlet port 72. Namely, in a case that the cover 73 is at an open position, the tank 70 is accessible from the front side of the casing 14. The phrase that "the tank 70 is accessible" means that the cap sealing each of the inlet ports 72 can be removed from the outside of the casing 14 and/or that the ink can be replenished in the storing space of the tank 70 via each of the inlet ports 72, etc. Note that it is not necessarily indispensable that the entirety of the tank 70 is positioned in the internal space of the casing 14. Further, it is allowable that the rotational axis 73A of the cover 73 is along the up-down direction.

<Passing Port 13>

As depicted in FIG. 1, the passing port 13 is a slender and elongated opening, in the front surface of the projected part 16, of which longitudinal direction is the left-right direction. The passing port 13 is a terminal end of the conveyance route 65. The part of the roller paper 11 and the recording paper sheet after the printing are discharged to the outside from the passing port 13. As depicted in FIG. 5, the passing port 13 is at a same position, in the up-down direction, as the tank 70. Further, the passing port 13 is positioned within a range L between an upper end and a lower end of the tank 70 in the up-down direction.

<Cutter 18>

As depicted in FIG. 1, the projected part 16 projecting frontward is provided on the front surface of the casing 14. An expose port 12 is formed in the projected part 16, at a location on the left side with respect to the passing port 13. The expose port 12 is opened frontward and upward, and an internal space of the projected part 16 is exposed to the outside via the expose port 12. As depicted in FIGS. 1 and 2, the expose port 12 is closed by a cover 19. The cover 19 is moved by rotation, etc., from a position at which the cover 19 closes the expose port 12, thereby releasing (opening) the expose port 12. Namely, the cover 19 opens and closes the expose port 12.

Figure 6:
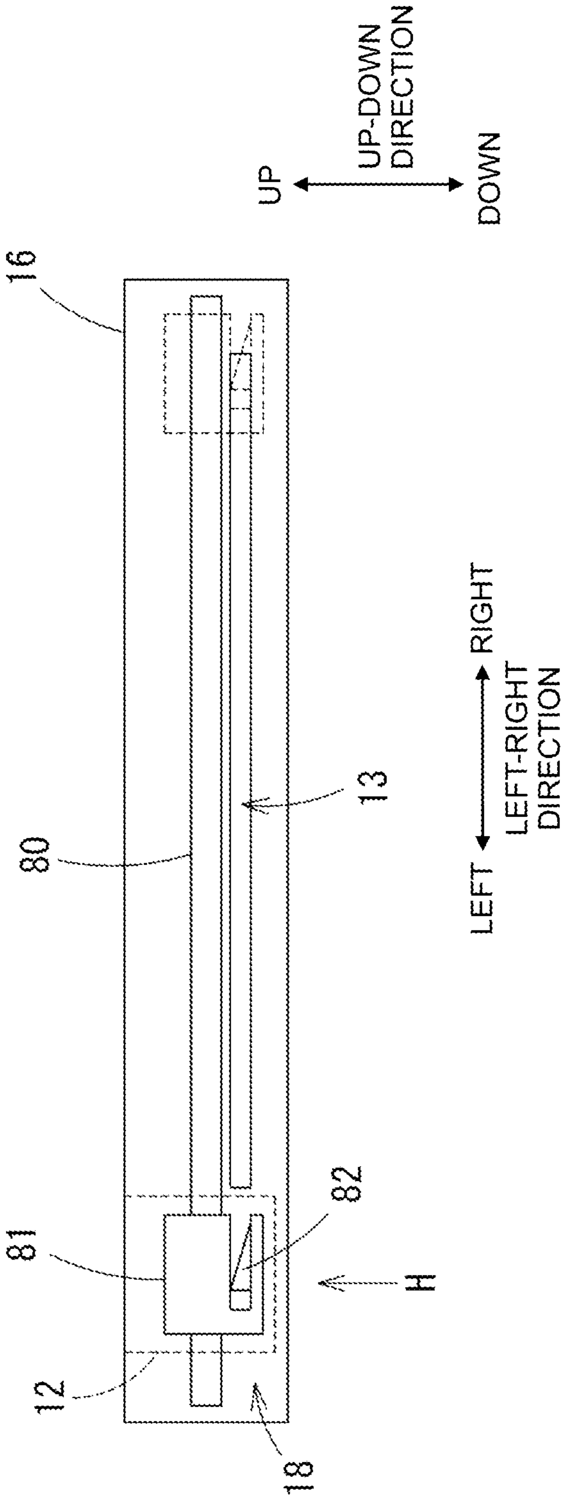
FIG. 6 is a schematic view depicting the configuration of a cutter 18.

As depicted in FIG. 6, a cutter 18 is positioned in the internal space of the projected part 16. The cutter 18 cuts a part, of the roll paper 11, which passes through the passing port 13 after the printing has been performed thereon. As depicted in FIG. 5, the cutter 18 is at a same position as the tank 70 in the up-down direction. Further, the cutter 18 is positioned within the range L between the upper end and the lower end of the tank 70 in the up-down direction.

As depicted in FIG. 6, the cutter 18 has a guide shaft 80 extending in the left-right direction, a cutter carriage 81 which moves along the guide shaft 80, and a blade 82 installed in the cutter carriage 81.

The guide shaft 80 is a stick-shaped member which extends up to the outside beyond the both end parts in the left-right direction of the passing port 13. The guide shaft 80 is supported by side walls of the projected part 16, etc. The cutter carriage 81 is supported by the guide shaft 80. Note that a cutter guide rail (not depicted in the drawings) which extends parallel the guide shaft 80 may be further provided, and the guide shaft 80 and the cutter guide rail may support the cutter carriage 81.

Although not depicted in the respective drawings, a publicly known belt mechanism is provided along the guide shaft 80. The cutter carriage 81 is connected an endless belt of the belt mechanism and moves in the left-right direction by the rotation of the endless belt. Namely, the left-right direction is a scanning direction of the cutter carriage 81. In a state that the cutter carriage 81 is in a standby state, namely, in a state that the printing apparatus does not perform the printing, the cutter carriage 81 is positioned, as depicted in FIG. 6, at a location of the left side of the guide shaft 80 and in the vicinity of the expose port 12. This position is a standby position H. The standby position H is a position away from the passing port 13 to the left side from the passing port 13 (to the left as seeing the printing apparatus 10 from the front side).

The blade 82 in installed in the cutter carriage 81. The blade 82 has a blade which is capable of cutting the roll paper 11, etc. The edge of the blade of the cuter 82 is oriented rightward (to the right side as seeing the printing apparatus 10 from the front side). In a case that the cutter carriage 81 is moved rightward from the standby position H, the blade of the blade 82 makes contact with a part of the roll paper 11 after the printing, and thereby cuts the part of the roll paper 11.

The blade 82 is connected to the cutter carriage 81 by screwing (not depicted in the drawings), etc. In a case that a screw is removed, the blade 82 becomes removable (detachable) from the cutter carriage 81. The blade 82 has an outer shape passable the expose port 12. In a case that the expose port 12 is open when the cutter carriage 82 is at the standby position H, the blade 82 can be removed from the cutter carriage 81 and be taken out to the outside. The cutter carriage 81 at the standby position H is positioned on the front side with respect to the operation panel 17, and thus the blade 82 can be removed frontward or upward via the expose port 12. A situation that an operation for taking out the blade 82 is made possible is referred to as "accessible to the blade 82"

Effects of Embodiment

According to the printing apparatus 10 according to the embodiment as described above, the passing port 13 and the cutter 18 are located at the same positions, respectively, as the tank 70 in the up-down direction, the tank 70 is positioned to be away from the passing port 13 to the right side in the left-right direction of the passing port 13, and that the cutter carriage 81 at the standby position H is positioned to be away from the passing port 13 to the left side in the left-right direction of the passing port 13. Thus, it is possible to realize the reduction in thickness of the printing apparatus 10, by suppressing the size in the up-down direction of the printing apparatus 10, and to suppress the size in the left-right direction of the printing apparatus 10, thereby making it possible to suppress the footprint of the printing apparatus 10. Further, the tank 70 and/or the part of the roll paper 11 after the printing can be accessed from the front side with respect to the casing 14.

Further, by opening the cover 16 to thereby expose the expose port 12 of the projected part 16, it is possible to exchange the blade 82 installed in the cutter carriage 81 which is at the standby position H.

Furthermore, by allowing the tray 20 at the tilted position to overlap with the storing space 26 of the holder 15 as seen from the up-down direction, the size in the front-rear direction of the printing apparatus 10 is suppressed. Moreover, since the tray 20 at the standing position does not tilt with respect to the up-down direction as compared with the tray 20 at the tilted position, the roll paper 11 can be easily installed in the storing space by locating the tray 20 at the standing position.

Further, the frequency at which the ink is replenished in the tank 70 is higher than the frequency at which the blade 82 is exchanged, and thus the operability is satisfactory by positioning the tank 70 at the right side (the right side as seeing the printing apparatus 10 from the front side) with respect to the passing port 13.

Furthermore, since the operation surface 17A of the operation panel 17 is oriented frontward, it is possible to see the display 33 and/or to operate the operation key 34 and the power source button 35 from the front side of the printing apparatus 10, which provides a satisfactory operability.

Moreover, since the cutter carriage 81 is positioned on the front side with respect to the operation panel 17, the operation panel 17 is less likely to interfere with a hand of the user, etc., in a case of accessing to the cutter carriage 81 via the expose port 12.

MODIFICATIONS

In the above-described embodiment, the tank 70 is fixed in the internal space of the casing 14, and the ink can be replenished in the storing space of the tank 70 via the inlet port 72. Further, the inlet port 72 is accessible from the downstream side in the conveyance direction of the casing 14, and the inlet port 72 is oriented to the downstream in the conveyance direction. Note that it is allowable to provide the inlet port 72 such that the inlet port 72 is oriented upward. In such a case, it is also possible to provide another cover covering the inlet port 72. It is possible to provide a cover covering the inlet port 72 which is oriented upward so that the cover is rotatable about a rotational axis along the left-right direction, and to provide the rotational axis, for the cover, on the upstream side in the conveyance direction of the cover. By adopting such a configuration, it is possible to access the inlet port covered by the cover, from the side of the front surface of the casing 14. Alternatively, it is also allowable that the tank is of a cartridge type which is attachable/detachable with respect to the casing 14, rather than being a tank in which the ink can be replenished, and that the cover 73 is opened so as to allow the tank 70 to be detached from the casing 14 in a frontward direction. Still alternatively, it is also allowable that the tank 70 is attachable/detachable with respect to the casing 14 and that the ink can be replenished in the storing space of the tank 70 via the inlet port.

Further, although the tank 70 has the plurality of storing spaces storing the four color inks which are the black, yellow, cyan and magenta inks, respectively, it is allowable that the tank 70 has, instead of the above-described configuration, a single storing space storing the black ink.

Furthermore, although the tank 70 stores the black, yellow, cyan and magenta pigment inks, the tank 70 may store, instead of the above, a black pigment ink, and yellow, cyan and magenta dye inks. Moreover, the tank 70 may store black, yellow, cyan and magenta dye inks. Further, the ink(s) stored in the tank 70 may be, for example, a conductive ink in which metal particles are dispersed in a solvent. Furthermore, the tank 70 may have a storing space storing the black, yellow, cyan and magenta inks and a storing space storing a conductive ink.

Moreover, a part of each of the passing port 13 and the cutter 18 may be located on the upper side or on the lower side with respect to the range between the upper end and the lower end of the tank 70 in the up-down direction. Namely, it is allowable that a part of each of the passing port 13 and the cutter 18 may be located in a range occupied by the tank 70 in the up-down direction. Further, the tank 70 and the standby position H of the cutter 18 may have positions with respect to the passing port 13 in the left-right direction which are reverse to those as described above. Namely, it is allowable that the tank 70 is positioned on the left side of the passing port 13, and that the standby position H is on the right side of the passing port 13.

Further, although the cutter 18 is provided on the internal space of the projected part 16, the present disclosure is not limited to or restricted by this. For example, it is allowable that the cutter 18 is provided on the internal space of the casing 14. In a case that the cutter 18 is provided on the internal space of the casing 14, the cutter 18 is positioned on the downstream side in the front-rear direction of the printing head 39.

Furthermore, the blade 82 may have a disc-shape having a rotational axis along the front-rear direction, instead of the shape in the above-described embodiment.

Figure 7:
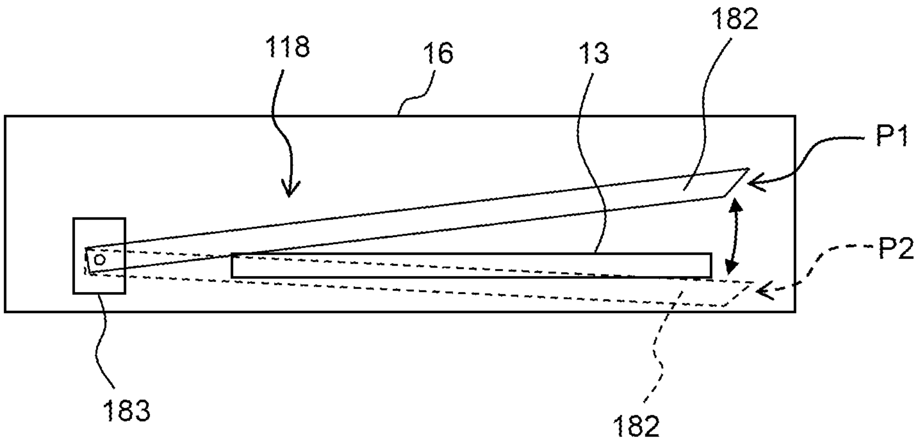
FIG. 7 is a schematic view depicting the configuration of a cutter 118.

In the above-described embodiment, the cutter 18 has the guide shaft 80, the cutter carriage 81 which moves along the guide shaft 80, and the blade 82 provided on the cutter carriage 81. The present disclosure, however, is not limited to such an aspect. For example, as depicted in FIG. 7, it is allowable that a cutter 118 has a blade 182 which is longer than a length in the left-right direction of the passing port 13, and a rotating mechanism 183 which causes the blade 182 to rotate (pivot), with an end in the left-right direction of the blade 182 as a support shaft or fulcrum. In this modification, the blade 182 rotates about a rotational axis along the conveyance direction (front-rear direction). Note that it is not necessarily indispensable that the rotational axis of the blade 182 is a direction along the conveyance direction; the rotational axis may extend obliquely with respect to the conveyance direction. The rotating mechanism 183 causes the blade 182 to rotate, by a non-illustrated motor, between a first position P1 at which the blade of the blade 182 is positioned on the upper side with respect to the passing port 13, and a second position P2 at which the blade of the blade 182 is positioned on the lower side with respect to the passing port 13. In a case that the blade 182 is rotated from the first position P1 toward the second position P2, the blade of the blade 182 makes contact with a part, of the paper sheet 11, after the printing which is discharged from the passing port 13 to thereby cut the part of the roll paper 11. Note that as depicted in FIG. 7, the rotating mechanism 183 is positioned to be away from the passing port 13 to the left side in the left-right direction. Also in this case, since at least a part of the cutter 118 (in this modification, the rotating mechanism 183) is positioned to be away from the passing port 13 to the left side in the left-right direction, it is possible to realize the reduction in thickness of the printing apparatus 10, by suppressing the size in the up-down direction of the printing apparatus 10, and to suppress the size in the left-right direction of the printing apparatus 10, thereby making it possible to suppress the footprint of the printing apparatus 10.

Figure 8:
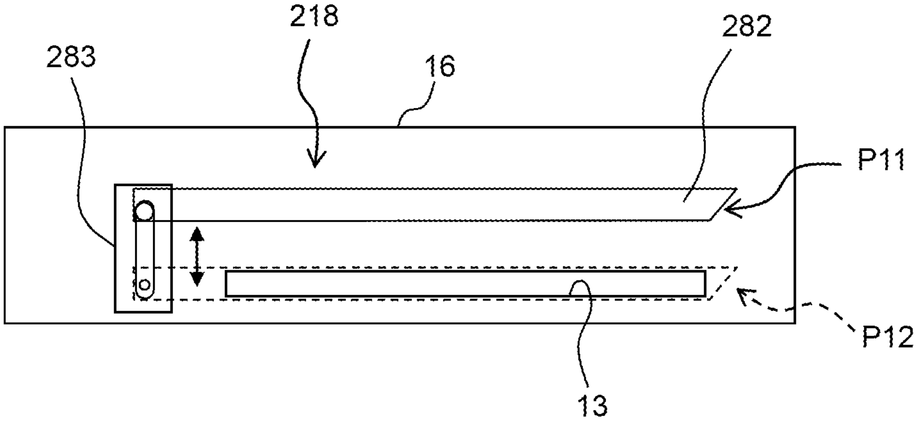
FIG. 8 is a schematic view depicting the configuration of a cutter 218.

Alternatively, as depicted in FIG. 8, it is allowable that a cutter 218 has a blade 282 which is longer than a length in the left-right direction of the passing port 13, and a sliding mechanism 283 which causes the blade 282 to slidably move in the up-down direction. The blade 282 has a substantially triangular shape of which length in the up-down direction becomes shorter toward the right side in the left-right direction. Namely, the blade of the blade 282 is inclined upward progressively toward the right side. The sliding mechanism 283 causes the blade 282 to slidably move, by a driving force generated by a non-illustrated motor, between a first position P11 at which the blade of the blade 282 is positioned on the upper side with respect to the passing port 13, and a second position P12 at which the blade of the blade 282 is positioned on the lower side with respect to the passing port 13. In a case that the blade 282 is moved from the first position P11 toward the second position P12, the blade of the blade 282 makes contact with a part, of the paper sheet 11, after the printing which is discharged from the passing port 13 to thereby cut the part of the roll paper 11. Note that as depicted in FIG. 8, the sliding mechanism 283 is positioned to be away from the passing port 13 to the left side in the left-right direction. Also in this case, since at least a part of the cutter 218 (in this modification, the sliding mechanism 283) is positioned to be away from the passing port 13 to the left side in the left-right direction, it is possible to realize the reduction in thickness of the printing apparatus 10, by suppressing the size in the up-down direction of the printing apparatus 10, and to suppress the side in the left-right direction of the printing apparatus 10, thereby making it possible to suppress the footprint of the printing apparatus 10.

Further, it is not necessarily indispensable that the passing port 13 is provided on the front surface 14A of the casing 14. For example, it is allowable that the passing port 13 is provided on the upper surface of the projected part 16 or the upper surface of the casing 14, and that a part of roll paper 11 after the printing which pass through the passing port 13 is discharged obliquely upward or upward.

Furthermore, the above-described print head 39 is a so-called serial head which discharge or eject the ink onto the roll paper 11, etc., while moving the head carriage 41 supported by the carriage guide rails 43 and 44 in the left-right direction. It is allowable, however, that the print head 39 may be so-called line head which has a width not less than the size in the left-right direction of the roll paper 11 and which ejects the ink onto the roll paper 11, etc., without moving in the left-right direction. Moreover, the print head 39 may be located at a position at which the print head 39 overlaps with the tank 70 in the front-rear direction.

Moreover, although the above-described printing apparatus 10 is capable of performing printing on the roll paper 11 and the recording paper sheet, the present disclosure is not limited to this. It is allowable that the printing apparatus 10 is an apparatus which performs printing only on the roll paper 11, or that the printing apparatus 10 is an apparatus which performs printing only on the recording paper sheet.

Further, although the above-described printing apparatus 10 is used in a state that the front surface 14A and the rear surface 14B of the casing 14 are along the up-down direction and the left-right direction, a posture in which the printing apparatus 10 is used is not limited to this.

What is claimed is:

1. A printing apparatus comprising:

a casing;

a conveyor positioned in the casing, and configured to convey a medium in a conveyance direction;

a head positioned downstream of the conveyor in the conveyance direction, and configured to discharge ink toward the medium conveyed in the conveyance direction by the conveyor;

a tank configured to store the ink to be supplied to the head, wherein at least a part of the tank is positioned in the casing;

an exit opening being opened in the casing, wherein the medium on which the ink has discharged from the head passes through the exit opening toward the downstream in the conveyance direction;

a cutter configured to cut the medium along a cutting direction crossing the conveyance direction, the cutter including:

a blade; and a moving mechanism configured to move the blade in the cutting direction;

a holder positioned upstream of the casing in the conveyance direction, and defining a storing space, wherein the medium which is a roll sheet is stored in the storing space such that a rotational axis of the medium is along the cutting direction; and a tray configured to support the medium which is a rectangular shaped sheet other than the roll sheet, at least a part of the tray being positioned downstream of the storing space of the holder in the conveyance direction, the tray being positioned upstream of the conveyor in the conveyance direction;

wherein at least a part of the exit opening overlaps with the tank in an orthogonal direction orthogonal to the conveyance direction and the cutting direction, wherein at least a part of the cutter overlaps with the tank in the orthogonal direction, wherein at least a part of the tray is configured to overlap with the storing space of the holder in the orthogonal direction, wherein a degree of exposure of the storing space when viewed in the orthogonal direction is changed in response to the tray moving between a first position and a second position, wherein the degree of exposure of the storing space in a case that the tray is in the first position is greater than the degree of exposure of the storing space in a case that the tray is in the second position, wherein a trajectory of an upper end of the tray in a case of moving between the first position and the second position overlaps with the rotational axis of the roll sheet when viewed in the orthogonal direction, and the trajectory of the upper end of the tray is located above the rotational axis of the roll sheet, and wherein in a case that the tray is in the second position, the roll sheet stored in the storing space is conveyed toward the head in the conveyance direction.

2. The printing apparatus according to claim 1, wherein the tank is positioned away from the exit opening to one side in the cutting direction, wherein a part of the cutter is positioned away from the exit opening to the other side in the cutting direction, wherein the moving mechanism of the cutter is a carriage including the blade and configured to move in the cutting direction, and in a case that the carriage is in a standby position, the carriage is positioned to the other side of the exit opening in the cutting direction and away from the exit opening.

3. The printing apparatus according to claim 2, wherein the cutter is positioned in the casing, and wherein the casing includes an exposure opening via which the blade is exposed to outside in the state that the carriage is in the standby position, and a cover configured to cover the exposure opening.

4. The printing apparatus according to claim 2, wherein the tank is positioned at one side with respect to the exit opening in the conveyance direction, and wherein the carriage in the standby position is positioned at the other side with respect to the exit opening in the conveyance direction.

5. The printing apparatus according to claim 1, wherein when the tray is positioned at the second position, the tray is tilted toward upstream in the conveyance direction to a greater extent than when the tray is positioned at the first position, and wherein the tray at the second position is arranged such that the tray is arranged beside the storing space in the orthogonal direction.

6. The printing apparatus according to claim 1, wherein an operation panel is located on the casing, and includes an operation surface via which an input with respect to the printing apparatus is received, wherein at least a part of the operation panel overlaps with the exit opening in the orthogonal direction, and wherein the operation surface is oriented toward downstream in the conveyance direction.

7. The printing apparatus according to claim 6, wherein a carriage which is the moving mechanism of the cutter is positioned at downstream of the operation panel in the conveyance direction.

8. The printing apparatus according to claim 1, wherein the head is positioned upstream of the tank in the conveyance direction.

9. The printing apparatus according to claim 1, wherein the tank includes an inlet port, and wherein the tank is replenishable with the ink via the inlet port.

10. The printing apparatus according to claim 1, wherein the tank is detachable from the casing toward downstream in the conveyance direction.

11. The printing apparatus according to claim 1, wherein the tank is positioned away from the exit opening to one side in the cutting direction, wherein the moving mechanism of the cutter is configured such that the blade rotates about an axis along the conveyance direction, with an end of the blade in the cutting direction as a support shaft, and wherein the moving mechanism is positioned away from the exit opening to the other side in the cutting direction.

12. The printing apparatus according to claim 1, wherein the tank is positioned away from the exit opening to one side in the cutting direction, wherein the moving mechanism of the cutter is configured to move the blade in the cutting direction, and wherein the moving mechanism is positioned away from the exit opening to the other side in the cutting direction.

13. The printing apparatus according to claim 1, wherein the tray is rotatable about an axis of the tray.

14. The printing apparatus according to claim 1, wherein a degree of overlap of the tray at the second position and the storing space of the holder is greater than a degree of overlap of the tray at the first position and the storing space of the holder.

15. The printing apparatus according to claim 1, further comprising a shaft located in the storing space, the shaft being configured to be inserted in a center space of the roll sheet, the center space of the roll sheet extending along a center axis of the roll sheet, and wherein the shaft and the cutter are located above a lower end of the tank and below an upper end of the tank.

16. A printing apparatus comprising:

a casing;

a conveyor positioned in the casing, and configured to convey a medium in a conveyance direction;

a head positioned downstream of the conveyor in the conveyance direction, and configured to discharge ink toward the medium conveyed in the conveyance direction by the conveyor;

a tank including an inlet, the tank being configured to store the ink to be supplied to the head;

an exit opening being opened in the casing toward the downstream in the conveyance direction, wherein the medium on which the ink has discharged from the head passes through the exit opening;

a cutter configured to cut the medium along a cutting direction crossing the conveyance direction, the cutter including:

a blade; and a moving mechanism configured to move the blade in the cutting direction;

a holder positioned upstream of the casing in the conveyance direction, and defining a storing space, wherein the medium which is a roll sheet is stored in the storing space such that a rotational axis of the medium is along the cutting direction; and a tray configured to support the medium which is rectangular shaped sheet other than the roll sheet, at least a part of the tray being positioned downstream of the storing space of the holder in the conveyance direction, the tray being positioned upstream of the conveyor in the conveyance direction;

wherein at least a part of the tray is configured to overlap with the storing space of the holder in the orthogonal direction, wherein the tray is configured to vary a degree of exposure of the storing space when viewed in the orthogonal direction in response to the tray moving between a first position and a second position, wherein the degree of exposure of the storing space in a case that the tray is in the first position is greater than the degree of exposure of the storing space in a case that the tray is in the second position, wherein the tray is rotatable about an axis of the tray, wherein the axis of the tray is located above the rotational axis of the medium, and wherein in a case that the tray is in the second position, the roll sheet stored in the storing space is conveyed toward the head in the conveyance direction.

17. The printing apparatus according to claim 1, further comprising a conveying route extending from the storing space to the head;

wherein the conveyor includes a roller pair, and wherein the tray is rotatable about a lower end of the tray, the lower end of the tray is located downstream of the storing space in the conveyance direction, is located above the conveying route in the orthogonal direction, and is located above a nip point of the roller pair in the orthogonal direction.

18. A printing apparatus comprising:

a casing;

a conveying roller pair positioned in the casing, and configured to convey a medium in a conveyance direction;

a head positioned downstream of the conveying roller pair in the conveyance direction, and configured to discharge ink toward the medium conveyed in the conveyance direction by the conveying roller pair;

a tank configured to store the ink to be supplied to the head, wherein at least a part of the tank is positioned in the casing;

an exit opening being opened in the casing, wherein the medium on which the ink has discharged from the head passes through the exit opening toward the downstream in the conveyance direction;

a cutter configured to cut the medium along a cutting direction crossing the conveyance direction, the cutter including:

a blade; and a moving mechanism configured to move the blade in the cutting direction;

a holder positioned upstream of the casing in the conveyance direction, and defining a storing space, wherein the medium which is a roll sheet is stored in the storing space such that a rotational axis of the medium is along the cutting direction;

a tray configured to support the medium which is a rectangular shaped sheet other than the roll sheet, at least a part of the tray being positioned downstream of the storing space of the holder in the conveyance direction, the tray being positioned upstream of the conveying roller pair in the conveyance direction; and a conveying route extending from the storing space to the head;

wherein at least a part of the exit opening overlaps with the tank in an orthogonal direction orthogonal to the conveyance direction and the cutting direction, wherein at least a part of the cutter overlaps with the tank in the orthogonal direction, wherein at least a part of the tray is configured to overlap with the storing space of the holder in the orthogonal direction, wherein a degree of exposure of the storing space when viewed in the orthogonal direction is changed in response to the tray moving between a first position and a second position, wherein the degree of exposure of the storing space in a case that the tray is in the first position is greater than the degree of exposure of the storing space in a case that the tray is in the second position, wherein a trajectory of an upper end of the tray in a case of moving between the first position and the second position overlaps with the rotational axis of the roll sheet when viewed in the orthogonal direction, and the trajectory of the upper end of the tray is located above the rotational axis of the roll sheet, and wherein the tray is rotatable about a lower end of the tray, the lower end of the tray is located downstream of the storing space in the conveyance direction, is located above the conveying route in the orthogonal direction, and is located above a nip point of the roller pair in the orthogonal direction.

* * * * *